United States Patent
Kuang et al.

(12)

(10) Patent No.: US 6,469,117 B1
(45) Date of Patent: Oct. 22, 2002

(54) DIALKENYL-TRICYCLIC-NONAROMATIC/ OLEFIN POLYMERS

(76) Inventors: Jianxin Kuang, 1617 SE. Kings Dr., Apt. 527, Bartlesville, OK (US) 74006; Michael D. Jensen, 2008 Skyline Dr., Bartlesville, OK (US) 74006; Maziar Sardashti, 623 Oak Ridge Ct., Bartlesville, OK (US) 74006

( * ) Notice: Subject to any disclaimer, the term of this patent is extended or adjusted under 35 U.S.C. 154(b) by 0 days.

(21) Appl. No.: 09/461,443

(22) Filed: Dec. 14, 1999

(51) Int. Cl.[7] .................................................. C08F 36/20
(52) U.S. Cl. ........................ 526/283; 526/160; 526/165; 526/281; 526/283
(58) Field of Search ................................ 526/160, 281, 526/283

(56) References Cited

U.S. PATENT DOCUMENTS

| | | | |
|---|---|---|---|
| 5,556,821 A | 9/1996 | Aida et al. ................... | 502/113 |
| 5,635,573 A | 6/1997 | Harrington et al. .......... | 526/170 |
| 5,698,651 A | 12/1997 | Kawasaki et al. ........... | 526/336 |

OTHER PUBLICATIONS

"Synthesis of Various Nonbridged Titanium(IV) Cyclopentadienyl–Aryloxy Complexes of the Type CpTi(OAr)$X_2$ and Their Use in the Catalysis of Alkene Polymerization. Important Roles of Substituents on both Aryloxy and Cyclopentadienyl Groups", 1998 American Chemical Society, *Organometallics* 1998, 17, 2152–2154.

*Primary Examiner*—David W. Wu
*Assistant Examiner*—Caixia Lu

(57) ABSTRACT

A process is provided to produce a dialkenyl-tricyclicnonaromatic/olefin polymer. The process comprises contacting at least one dialkenyl-tricyclic-nonaromatic compound, at least one olefin, at least one titanium complex, and at least one aluminoxane in a polymerization zone under polymerization conditions to form the dialkenyl-tricyclicnonaromatic/olefin polymer.

10 Claims, No Drawings

DIALKENYL-TRICYCLIC-NONAROMATIC/OLEFIN POLYMERS

FIELD OF THE INVENTION

This invention is related to the field of polymers comprising a polymerized dialkenyl-tricyclic-nonaromatic compound and a polymerized olefin.

BACKGROUND OF THE INVENTION

Polymer compounds represent a very important and highly versatile material of construction. They have become truly indispensable and are essential for clothing, shelter, transportation, and many conveniences of modern living. Therefore, there is a strong market for polymers throughout the world resulting in billions of dollars of sales per year. Most plastics can be easily fabricated into various products by such processes, for example, as blow molding, injection molding, and thermoforming. There is a significant amount of research conducted to find new polymers to supply the demand for such lightweight and versatile materials.

Processes that currently form polymers comprising a dialkenyl-tricyclic-nonaromatic compound as shown in Formula I:

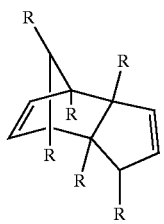

where R can be selected from the group consisting of hydrogen and alkyl groups having 1 to about 4 carbon atoms, and an olefin can produce a crosslinked polymer. Polymers that form crosslinking with each other or with other compounds can be insoluble and stable to heat. These polymers generally cannot be dissolved to allow admixture with other compounds or to flow or melt to form articles. It is desirable to produce a dialkenyl-tricyclic-nonaromratic/olefin polymer that is not crosslinked since it could be utilized for various applications.

Applicants provide such a process for producing a dialkenyl-tricyclic-nonaromatic/olefin polymer that is not crosslinked.

SUMMARY OF THE INVENTION

An object of this invention is to provide a process that produces a dialkenyl-tricyclic-nonaromatic/olefin polymer that is not crosslinked.

Another object of this invention is to provide the dialkenyl-tricyclic-nonaromatic/olefin polymer.

In accordance with one embodiment of this invention, a process to produce the dialkenyl-tricyclic-nonaromatic compound/olefin polymer is provided. The process comprises (or optionally, "consists essentially of", or "consists of") contacting:

1) at least one dialkenyl-tricyclic-nonaromatic compound;
2) at least one olefin;
3) at least one titanium complex; and
4) at least one aluminoxane;

in a polymerization zone under polymerization conditions to form the dialkenyl-tricyclic-nonaromatic/olefin polymer.

In accordance with another embodiment of this invention, the dialkenyl-tricyclic-nonaromatic/olefin polymer is provided.

In accordance with yet another embodiment of this invention, an article is produced comprising the dialkenyl-tricyclic-nonaromatic compound/olefin polymer.

This object, and other objects, will become more apparent to those with ordinary skill in the art after reading this disclosure.

DETAILED DESCRIPTION OF THE INVENTION

A process to produce a dialkenyl-tricyclic-nonaromatic/olefin polymer is provided. The process comprises contacting:

1) at least one dialkenyl-tricyclic-nonaromatic compound;
2) at least one olefin;
3) at least one titanium complex; and
4) at least one aluminoxane in a polymerization zone under polymerization conditions to form the dialkenyl-tricyclic-nonaromatic compound/olefin polymer.

The dialkenyl-tricyclic-nonaromatic compound has the formula:

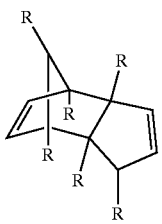

wherein R can be selected from the group consisting of hydrogen and alkyl groups having from 1 to about 4 carbon atoms. Preferably, the dialkenyl-tricyclic-nonaromatic compound is dicyclopentadiene (DCPD).

The olefin that can be used in this invention contains from 2 to about 20 carbon atoms. However, it is more preferred when the olefin contains 2 to about 10 carbon atoms. It is most preferred when the olefin has 2 to 6 carbon atoms. Olefins can be selected from the group consisting of ethylene, propylene, butylene, pentene, and hexene. Ethylene is currently most preferred.

The dialkenyl-tricyclic-nonaromatic compound and the olefin are polymerized using at least one titanium complex. The titanium complex has the following general formula:

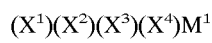

wherein $M^1$ is titanium;
wherein $(X^1)$ is independently selected from the group consisting of cyclopentadienyls, indenyls, fluorenyls, substituted cyclopentadienyls, substituted indenyls, and substituted fluorenyls;
wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, oxygen groups such as, alkoxides and aryloxides, silicon, phosphorus, boron, germanium, and hydrogen; and wherein (X²), (X³), and (X⁴) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkoxide groups, substituted alkoxide groups, aryloxide groups, substituted aryloxide groups, organometallic groups, and substituted organometallic groups.

Examples of suitable titanium complexes include, but are not limited to:

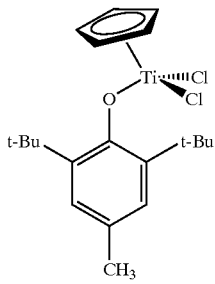

$\eta^5$-cyclopentadienyl(2,6-di-tert-butyl-4-methylphenoxy) titanium(IV) dichloride;

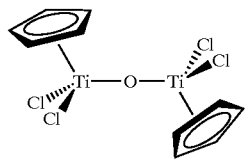

bis($\eta^5$-cyclopentadienyldichlorotitanium) oxide;

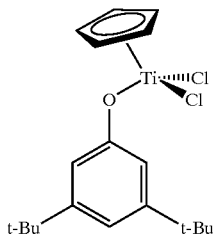

$\eta^5$-cyclopentadienyl(3,5-di-tert-butylphenoxy)titanium (IV) dichloride; and

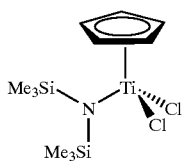

$\eta^5$-cyclopentadienyl(N,N-bis(trimethylsilyl)amido) titanium(IV) dichloride Preferably, the titanium complex is

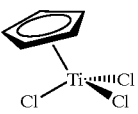

$\eta^5$-cyclopentadienyl titanium(IV) trichloride.

Aluminoxanes are cyclic or linear polymeric aluminum compounds. Cyclic aluminoxanes are represented by the formula $R(R-Al-O)_n$, and linear aluminoxanes are represented by the formula $R(R-Al-O-)_nAlR$. R is an alkyl group having from 1 to about 5 carbon atoms per radical, such as, for example, methyl, ethyl, propyl, butyl, and pentyl, and n is an integer from 1 to about 20. Most preferably, R is methyl, and n is about 4.

The polymerization is conducted in a polymerization zone. The polymerization can be conducted in a solution polymerization process or a slurry polymerization process. A solution polymerization process is preferred. In the solution polymerization process, a hydrocarbon solvent capable of dissolving the dialkenyl-tricyclic-nonaromatic compound, olefin, titanium complex, and the dialkenyl-tricyclic-nonaromatic/olefin polymer is utilized. The solvent can be selected from the group consisting of hexane, cyclohexane, toluene, benzene, xylene, t-butylbenzene, and mixtures thereof. Preferably, the solvent is toluene.

In a solution polymerization process, the temperature is in a range of about 0° C. to about 300° C. However, it is more preferred when the temperature is in a range of about 20° C. to about 200° C., and it is most preferred when the temperature is in a range of 50° C. to 120° C.

In a solution polymerization process, the pressure is in a range of about 100 kPa to about 10000 kPa. However, it is more preferred when the pressure is in the range of about 500 kPa to about 6000 kPa, and it is most preferred when the pressure is in the range of 500 kPa to 5000 kPa.

If a slurry polymerization process is utilized, it is preferred to use a loop slurry reactor. These reactors are well known in the polyethylene polymerization art.

The dialkenyl-tricyclic-nonaromatic/olefin polymer produced by this process comprises about 0.1 to about 90 weight percent polymerized dialkenyl-tricyclic-nonaromatic compound based on the weight of the dialkenyl-tricyclic-nonaromatic/olefin polymer. However, it is more preferred when the dialkenyl-tricyclic-nonaromatic/olefin polymer produced by this process comprises about 20 to about 90 weight percent polymerized dialkenyl-tricyclic-nonaromatic compound based on the weight of the dialkenyl-tricyclic-nonaromatic/olefin polymer, and it is most preferred when the dialkenyl-tricyclic-nonaromatic/olefin polymer produced by this process comprises 40 to 80 weight percent polymerized dialkenyl-tricyclic-nonaromatic based on the weight of the dialkenyl-tricyclic-nonaromatic/olefin polymer.

In a more specific embodiment of this invention, a process is provided to produce an ethylene/DCPD polymer. The process comprises contacting n⁵-cyclopentadienyl titanium (IV) trichloride, ethylene, dicyclopentadiene, and methylaluminoxane in a solution polymerization process to produce the ethylene/DCPD polymer.

The dialkenyl-tricyclic-nonaromatic/olefin polymer produced is not crosslinked. There is no ring opening as a result of the polymerization reaction. The non-crosslinking of the dialkenyl-tricyclic-nonaromatic/olefin polymer is indicated by its ability to dissolve in a solvent at 70° C., such as, for example, trichlorobenzene. Crosslinked polymers typically can be insoluble even at higher temperature. Further evidence of no crosslinking is the nuclear magnetic resonance (NMR) spectrum of the dialkenyl-tricyclic-nonaromatic/olefin polymer shows peaks in the olefinic region of the spectrum which confirms the fact that the non-reacting double bond is still intact. In addition, the spectrum shows that the 5,6-double bond (i.e norbornene ring alkenyl constituent) is the one that is polymerizing.

Divinyl-dicyclo-nonaromatic/olefin polymers can be utilized to produce package film, medical equipment, such as syringes or vials, and optical equipment, such as data storage media, industrial lenses, ophthalmic lenses, projection lenses, automotive lenses, and lamp reflectors.

EXAMPLES

Polymerization Process

The following polymerization procedure was utilized in all of the examples. First, varying amounts of 86 to 98 wt % DCPD in toluene were charged to a dry, 1 gallon reactor, which was then heated to 70° C. The specific amounts of DCPD used are specified in Table 1. In Examples 1–10, 200 milliliters of polymerization grade toluene were charged to the reactor; however in Examples 11–12, the 200 milliliters of toluene were not added. Then, the reactor was pressured to 150 psig with ethylene and then depressured. This pressure/depressure cycle was completed three times. Ethylene was then charged to maintain a pressure of 100 psig in the reactor. Then, the ethylene pressure was increased to 300 psig and maintained for 15 minutes while the reactor was stirred. The ethylene flow was then stopped, and the reactor was vented to 50 or 100 psig. 10–30 milliliters of 10 wt % methylaluminoxane (MAO) in toluene and 0.01 to 0.04 grams of a titanium complex were then charged to the reactor. The ethylene flow to the reactor was re-established at between 50 and 300 psig and maintained for between 60 to 90 minutes to produce an ethylene/dicyclopentadiene polymer mixture comprising ethylene/dicyclopentadiene polymer, toluene, and unreacted ethylene and DCPD. The ethylene flow was then stopped by adding 5 milliliters of methanol, and the reactor was allowed to cool. The ethylene/dicyclopentadiene polymer mixture was then washed and dried in a vacuum oven at 50° C. In some examples, 5 milliliters of an antioxidant solution were also added to the ethylene/dicyclopentadiene polymer mixture prior to drying. The antioxidant solution contained 10 weight percent tris (p-nonylphenyl) phosphite (TNPP) and 40 weight percent tetrakis(methylene(3,5-di-tert-butyl-4-hydroxyhydrocinnamate in cyclohexane. The TNPP was obtained from GE Specialty Chemicals in Parkersburg, W.Va. The tetrakis(methylene(3,5-di-tert-butyl-4-hydroxyhydrocinnamate was obtained as Irganox® 1076 from Ciba-Geigy Corporation in Hawthorne, N.Y.

Example 1

In this example, $\eta^5$-cyclopentadienyl(2,6-di-tert-butyl-4-methylphenoxy)titanium(IV) dichloride was used to polymerize ethylene and 50 grams of 98% by weight DCPD in toluene by the polymerization procedure discussed previously. 10 milliliters of 10 wt % MAO in toluene were added during this polymerization. 212 grams of an ethylene/dicyclopentadiene polymer mixture were obtained. The ethylene/dicyclopentadiene mixture then was dried in a vacuum oven to yield an ethylene/dicyclopentadiene polymer with a dry weight of 0.8 grams. The activity of the $\eta^5$-cyclopentadienyl(2,6-di-tert-butyl-4-methylphenoxy) titanium(IV) dichloride was 80 grams of ethylene/dicyclopentadiene polymer per gram of $\eta^5$-cyclopentadienyl (2,6-di-tert-butyl-4-methylphenoxy)titanium(IV) dichloride per hour.

Example 2

In this example, $\eta^5$-cyclopentadienyl(2,6-di-tert-butyl-4-methylphenoxy)titanium(IV) dichloride was used again to polymerize ethylene and DCPD in toluene as in Example 1 except during this experiment 110 grams of 91.5% by weight DCPD in toluene were added to the reactor. 26.3 grams of an ethylene/dicyclopentadiene polymer mixture were obtained. The ethylene/dicyclopentadiene polymer mixture was washed with 1% by weight HCl, then washed with water, and finally the ethylene/dicyclopentadiene polymer was washed with acetone. The ethylene/dicyclopentadiene polymer was dried in a vacuum oven to a dry weight of 2.9 grams yielding an activity of 290 grams of ethylene/dicyclopentadiene polymer per gram of $\eta^5$-cyclopentadienyl (2,6-di-tert-butyl-4-methylphenoxy)titanium(IV) dichloride per hour.

Example 3

In this example, $\eta^5$-cyclopentadienyl(2,6-di-tert-butyl-4-methylphenoxy)titanium(IV) dichloride was used to polymerize ethylene and DCPD as in Example 2 except during this polymerization 30 milliliters of 10 wt % MAO in toluene were added to the reactor. In addition, the antioxidant solution discussed previously was added to the ethylene/dicyclopentadiene polymer mixture. Soft white ethylene/dicyclopentadiene polymer was produced. The ethylene/dicyclopentadiene polymer mixture was washed with 1% by weight HCl and then washed with acetone. The polymer was dried in a vacuum oven to a dry weight of 35.6 grams yielding an activity of 3560 grams of ethylene/dicyclopentadiene polymer per gram of $\eta^5$-cyclopentadienyl (2,6-di-tert-butyl-4-methylphenoxy)titanium(IV) dichloride per hour.

Example 4

Bis($\eta^5$-cyclopentadienyldichlorotitanium) oxide was used for this polymerization. 30 milliliters of 10 wt % MAO in toluene and 110 grams of 91.5 wt % DCPD in toluene were added to the reactor. Fluff type polymer was produced. The ethylene/dicyclopentadiene polymer mixture was washed with acetone and dried in a vacuum oven to produce a dry weight of 51.4 grams. This catalyst had an activity of 5140 grams of ethylene/dicyclopentadiene polymer per gram of bis($\eta^5$-cyclopentadienyldichlorotitanium) oxide per hour.

Example 5 & 6

In Example 5, $\eta^5$-cyclopentadienyl(3,5-di-tert-butylphenoxy)titanium(IV) dichloride was used for this polymerization. 30 milliliters of 10 wt % MAO in toluene and 118 grams of 85 wt % DCPD in toluene were added to the reactor. Fluff type polymer was produced. The ethylene/dicyclopentadiene polymer mixture was washed with methanol and contacted with 5 milliliters of antioxidant solution. The ethylene/dicyclopentadiene polymer mixture was then dried in a vacuum oven to produce a dry weight of 13.9 grams. This catalyst had an activity of 1390 grams of ethylene/dicyclopentadiene polymer per gram of $\eta^5$-cyclopentadienyl(3,5-di-teri-butylphenoxy)titanium(IV) dichloride per hour.

The experiment in Example 5 was repeated in Example 6 except the ethylene/dicyclopentadiene polymer mixture was washed with toluene and then acetone. It was then dried in a vacuum oven to produce 46.7 grams of dry polymer which yielded an activity of 4650 grams of ethylene/ dicyclopentadiene polymer per gram of $\eta^5$-cyclopentadienyl (3,5-di-tert-butylphenoxy)titanium(IV) dichloride per hour.

Example 7 & 8

Bis($\eta^5$-cyclopentadienyldichlorotitanium) oxide was used for this polymerization. 30 milliliters of 10 wt % MAO in toluene and 118 grams of 85 wt % DCPD in toluene were added to the reactor. The ethylene/dicyclopentadiene polymer mixture was dried in a vacuum oven to produce a dry weight of 41.4 grams. This catalyst had an activity of 4140 grams of ethylene/dicyclopentadiene polymer per gram of bis($\eta^5$-cyclopentadienyldichlorotitanium) oxide per hour.

Example 7 was repeated. The ethylene/dicyclopentadiene polymer mixture produced was washed with acetone, then toluene, then finally with methanol. The ethylene/dicyclopentadiene polymer mixture was then dried in a vacuum oven. This polymerization produced 24.9 grams of polymer yielding an activity of 2490 grams of ethylene/dicyclopentadiene polymer per gram of bis($\eta^5$-cyclopentadienyldichlorotitanium) oxide per hour.

Example 9

In this example, $\eta^5$-cyclopentadienyl (N,N-bis(trimethylsilyl)amido)titanium(IV) dichloride was used for this polymerization. 30 milliliters of 10 wt % MAO in toluene and 118 grams of 85 wt % DCPD in toluene were added to the reactor. 314 grams of an ethylene/dicyclopentadiene polymer mixture were produced. The polymer mixture was dried in a vacuum oven to produce a dry weight of 6.1 grams yielding an activity of 610 grams of ethylene/dicyclopentadiene polymer per gram of $\eta^5$-cyclopentadienyl(N, N-bis(trimethylsilyl)amido)titanium(IV) dichloride per hour.

Example 10

In this example, bis($\eta^5$-cyclopentadienyldichlorotitanium) oxide was used for this polymerization. 120 milliliters of 10 wt % MAO in toluene and 472 grams of 85 wt % DCPD in toluene were added to the reactor. The ethylene/dicyclopentadiene polymer mixture was washed three times with acetone and then three times with methanol. It was then dried in a vacuum oven to produce 119 grams of dry polymer which yielded an activity of 2975 grams of ethylene/dicyclopentadiene polymer per gram of bis($\eta^5$-cyclopentadienyldichlorotitanium) oxide per hour.

Example 11

In this example, $\eta^5$-cyclopentadienyl(3,5-di-tert-butylphenoxy)titanium(IV) dichloride was used for this polymerization. 30 milliliters of 10 wt % MAO in toluene and 300 grams of 89.2 wt % DCPD in toluene were added to the reactor. The ethylene/dicyclopentadiene polymer mixture was washed twice with acetone. It was then dried in a vacuum oven to produce 38.90 grams of dry polymer which yielded an activity of 5210 grams of ethylene/dicyclopentadiene polymer per gram of $\eta^5$-cyclopentadienyl (3,5-di-tert-butylphenoxy)titanium(IV) dichloride per hour.

Example 12

In this example, $\eta^5$-cyclopentadienyl(3,5-di-tert-butylphenoxy)titanium(IV) dichloride was used for this polymerization. 30 milliliters of 10 wt % MAO in toluene and 300 grams of 86.8 wt % DCPD in toluene were added to the reactor. The ethylene/dicyclopentadiene polymer mixture was washed with acetone. It was then dried in a vacuum oven to produce 19.88 grams of dry polymer which yielded an activity of 4580 grams of ethylene/dicyclopentadiene polymer per gram of $\eta^5$-cyclopentadienyl(3,5-di-tert-butylphenoxy)titanium(IV) dichloride per hour.

Example 13

In this example, $\eta^5$-cyclopentadienyl titanium (IV) trichloride was used for this polymerization. 30 milliliters of 10 weight percent MAO in toluene, 100 grams of 97.96 weight percent DCPD in toluene and 200 milliliters of toluene were added to the reactor. The ethylene/dicyclopentaidene polymer mixture produced was washed with acetone. It was then dried in a vacuum oven to produce 118.90 grams of dry polymer which yielded an activity of 11890 grams of ethylene/dichclopentadiene polymer per gram of $\eta^5$-cyclopentadienyl titanium (IV) trichloride per hour.

Example 14

In this example, $\eta^5$-cyclopentadienyl titanium (IV) trichloride was used for this polymerization. 30 milliliters of 10 weight percent MAO in toluene, 270 grams of 97.96 weight percent DCPD and 30 ml toluene were added to the reactor. The ethylene/dicyclopentadiene polymer mixture was washed three times with methanol. It was then dried in a vacuum oven to produce 91.70 grams of dry polymer which yielded an activity of 9170 grams of ethylene/dicyclopentadiene polymer per gram of $\eta^5$-cyclopentadienyl titanium (IV) trichloride per hour.

TABLE I

| Example | Titanium Complex | Titanium Complex Amount (g) | MAO (ml) | Ethylene (psig) | DCPD (g) | Temp. (° C.) | Toluene (ml) | Polymer (g) | Wt. % of DCPD in Polymer | Activity* |
|---|---|---|---|---|---|---|---|---|---|---|
| 1 | Catalyst 1 | 0.01 | 10 | 300 | 50 | 70 | 200 | 0.8 | | 80 |
| 2 | Catalyst 1 | 0.01 | 10 | 300 | 110 | 70 | 200 | 2.9 | | 290 |
| 3 | Catalyst 1 | 0.01 | 30 | 300 | 110 | 70 | 200 | 35.6 | 12.6 | 3560 |
| 4 | Catalyst 2 | 0.01 | 30 | 300 | 110 | 70 | 200 | 51.4 | | 5140 |
| 5 | Catalyst 3 | 0.01 | 30 | 300 | 118 | 70 | 200 | 13.9 | | 1390 |
| 6 | Catalyst 3 | 0.01 | 30 | 300 | 118 | 70 | 200 | 46.7 | | 4650 |
| 7 | Catalyst 2 | 0.01 | 30 | 300 | 118 | 70 | 200 | 41.4 | 26.2 | 4140 |
| 8 | Catalyst 2 | 0.01 | 30 | 300 | 118 | 70 | 200 | 24.9 | 13.6 | 2490 |
| 9 | Catalyst 4 | 0.01 | 30 | 300 | 118 | 70 | 200 | 6.1 | | 610 |
| 10 | Catalyst 2 | 0.04 | 120 | 300 | 472 | 70 | 1200 | 119 | 23.4 | 2975 |
| 11 | Catalyst 3 | 0.01 | 30 | 100 | 300 | 70 | 0 | 38.9 | 52.1 | 5210 |
| 12 | Catalyst 3 | 0.01 | 30 | 50 | 300 | 70 | 0 | 19.88 | 45.8 | 4580 |
| 13 | Catalyst 5 | 0.01 | 30 | 300 | 100 | 70 | 200 | 118.90 | — | 11890 |

TABLE I-continued

| Example | Titanium Complex | Titanium Complex Amount (g) | MAO (ml) | Ethylene (psig) | DCPD (g) | Temp. (° C.) | Toluene (ml) | Polymer (g) | Wt. % of DCPD in Polymer | Activity* |
|---|---|---|---|---|---|---|---|---|---|---|
| 14 | Catalyst 5 | 0.01 | 30 | 300 | 270 | 70 | 30 | 91.7 | — | 9170 |

Catalyst 1 = n⁵-cyclopentadienyl(2,6-di-tert-butyl-4-methylphenoxy)titanium(IV) dichloride
Catalyst 2 = bis(n⁵-cyclopentadienyldichlorotitanium) oxide
Catalyst 3 = n⁵-cyclopentadienyl(3,5-di-tert-butylphenoxy)titanium(IV) dichloride
Catalyst 4 = n⁵-cyclopentadienyl(N,N-bis(trimethylsilyl)amido)titanium(IV) dichloride
Catalyst 5 = n⁵-cyclopentadienyl titanium(IV) trichloride
*grams of polymer per gram of titanium complex per hour While this invention has been described in detail for the purpose of illustration, it is not intended to be limited thereby but is intended to cover all changes and modifications within the spirit and scope thereof.

That which is claimed is:

1. A process for producing a polymer of at least one alpha-olefin and at least one dialkenyl-tricyclic-nonaromatic compound, wherein the polymer is soluble in trichlorobenzene at 70° C. comprising contacting monomers consisting essentially of at least one alpha-olefin having 2 to 20 carbon atoms and at least one dialkenyl-tricyclic-nonaromatic compound of the formula

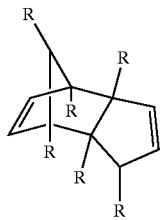

under polymerization conditions in the presence of a catalyst composition consisting essentially of the product resulting from the combination of at least one aluminoxane and at least one titanium complex which is a metallocene having only one cyclodienyl group pi-bonded to the titanium wherein no substituents of the cyclodienyl group are bonded to the titanium.

2. A process according to claim 1 wherein said titanium complex is selected from the group consisting of $\eta^5$-cyclopentadienyl(2,6-di-tert-butyl-4-methylphenoxy)titanium(IV) dichloride, bis($\eta^5$-cyclopentadienyldichlorotitanium) oxide, $\eta^5$-cyclopentadienyl(3,5-di-tert-butylphenoxy)titanium(IV) dichloride, and $\eta^5$-cyclopentadienyl(N,N-bis(trimethylsilyl)amido)titanium(IV) dichloride, and $\eta^5$-cyclopentadienyl titanium(IV) trichloride, and mixtures thereof.

3. A process according to claim 2 carried out under solution polymerization conditions.

4. A process according to claim 2 wherein ethylene is copolymerized with dicyclopentadiene.

5. A process according to claim 4 wherein the titanium complex has a ligand which includes an oxygen bonded to the titanium.

6. A process according to claim 5 which uses $\eta^5$-cyclopentadienyl(2,6-di-tert-butyl-4-methylphenoxy)titanium(IV) dichloride.

7. A process according to claim 5 which uses bis($\eta^5$-cyclopentadienyldichlorotitanium) oxide.

8. A process according to claim 5 which uses $\eta^5$-cyclopentadienyl(3,5-di-tert-butylphenoxy)titanium(IV) dichloride.

9. A process according to claim 4 which uses $\eta^5$-cyclopentadienyl titanium trichloride.

10. A process according to claim 4 which produces a polymer having cyclic units in which a double bond of the divinyl-dicyclo-nonaromatic compound remains.

* * * * *

UNITED STATES PATENT AND TRADEMARK OFFICE
CERTIFICATE OF CORRECTION

PATENT NO.   : 6,469,117 B1
DATED        : October 22, 2002
INVENTOR(S)  : Jianxin Kuang, Michael D. Jensen and Maziar Sardashti It is certified that error appears in the above-identified patent and that said Letters Patent is hereby corrected as shown below:

Column 9,
Line 36, insert the following content directly below the drawing of the structure:
-- Wherein R is selected from the group consisting of hydrogen and alkyl groups having from 1 to about 4 carbon atoms, --

Signed and Sealed this

Eleventh Day of March, 2003

JAMES E. ROGAN
*Director of the United States Patent and Trademark Office*